Dec. 23, 1958  R. GÖRIKE  2,865,464
UNIDIRECTIONAL DYNAMIC MICROPHONE
Filed July 28, 1955  3 Sheets-Sheet 1

INVENTOR.
Rudolf Görike
BY
ATTORNEY.

Dec. 23, 1958 R. GÖRIKE 2,865,464
UNIDIRECTIONAL DYNAMIC MICROPHONE
Filed July 28, 1955 3 Sheets-Sheet 2

INVENTOR.
Rudolf Görike
BY
ATTORNEY

Dec. 23, 1958  R. GÖRIKE  2,865,464
UNIDIRECTIONAL DYNAMIC MICROPHONE
Filed July 28, 1955  3 Sheets-Sheet 3
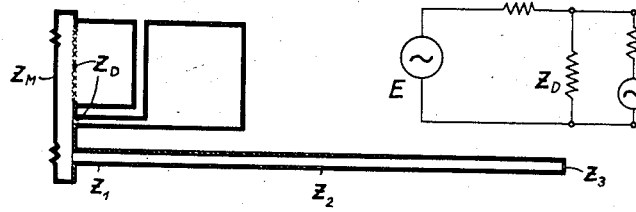
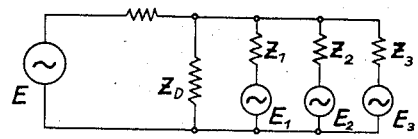
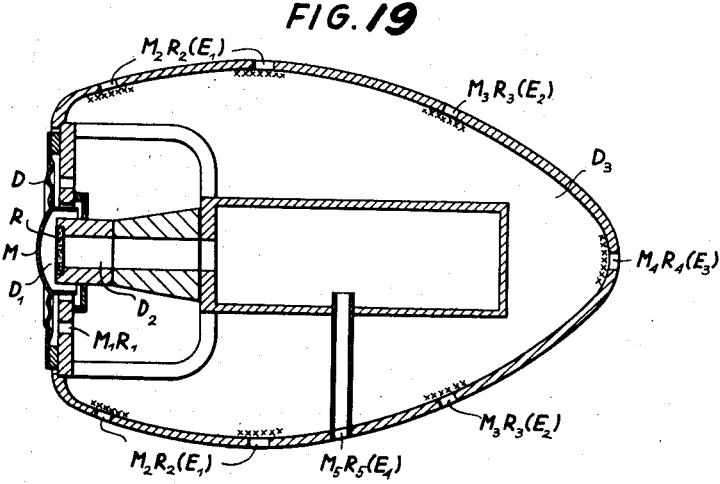
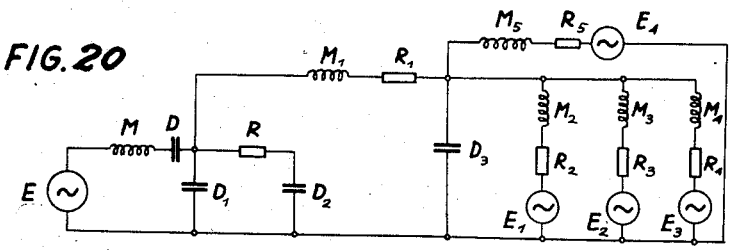
INVENTOR.
Rudolf Görike
BY
ATTORNEY

United States Patent Office 2,865,464
Patented Dec. 23, 1958

2,865,464

UNIDIRECTIONAL DYNAMIC MICROPHONE

Rudolf Görike, Vienna, Austria

Application July 28, 1955, Serial No. 525,027

Claims priority, application Austria August 7, 1954

21 Claims. (Cl. 181—31)

This invention relates to a unidirectional dynamic microphone of the type which is responsive in a certain frequency range and which comprises a single diaphragm and means defining a low air chamber with the rear face of said diaphragm.

In this specification the term "low air chamber" refers to a chamber defined between the diaphragm and a mechanical confining means which is disposed a small distance behind the diaphragm and extends substantially parallel thereto. The distance between this confining means and the diaphragm should be sufficient, however, to prevent the diaphragm from contacting the confining means even under high sound pressure or climatic or temperature influences. In practice this distance may vary between 0.3 mm. and 0.8 mm.

It is known to design dynamic microphones, particularly of the moving-coil type, for a unidirectional effect. In one known construction the diaphragm is directly exposed to the sound field on one side whereas the other side is acoustically influenced through an acoustic device rotating the phase of the sound waves, and frictional resistances in conjunction with a cavity.

In another known embodiment the rear side of the diaphragm is coupled through a very low air chamber to air plugs contained in narrow tubes, whose length is less than half, suitably a quarter of the wave-length of the highest frequency to be transmitted and which lead directly into the open.

In this specification the term "air plug" refers to a body of air which is contained in a tube and has a cross-section which is much smaller in diameter than the length of said body to provide for a velocity of the air in the tube. Moreover, the cross-section of the air plug is much smaller than the area of the diaphragm to provide for a strong mass action of the plug.

It has been found that in the former case it is difficult to maintain the acoustic conditions required for a unidirectional effect in the transmitted range and that in the second case the driving force due to the pressure gradient is small owing to the small length of the air plugs, so that the microphone has an increased sensitivity to shock.

It is an object of the invention to provide a microphone of the type described in which the aforesaid disadvantages are avoided.

According to the invention the microphone comprises means defining a cavity whose length is substantially larger than the shortest wavelength of said frequency range, said cavity being arranged to connect said low air chamber, which will hereinafter also be referred to as the first air chamber directly to the sound field surrounding the microphone and having such an effective cross-sectional area that said diaphragm forms with respect to said cavity a terminating impedance which corresponds substantially to the characteristic impedance of a cavity of said effective cross-sectional area and of infinite length, means defining a second air chamber, and frictional resistance means connecting said second air chamber to said first air chamber.

The said means defining said cavity may comprise a tube.

In this specification and the appended claims, the effective cross-sectional area of a cavity or tube is considered equal to the actual cross-sectional area of a peripherally unapertured cavity or tube which has a uniform cross-sectional area and is equivalent to the cavity or tube considered with respect to all other factors determining the impedance of the cavity or tube when seen from the diaphragm.

The said first air chamber may have connected thereto at least one additional tube shorter than said first-mentioned tube, all said tubes being stepped in length and equal or different in cross-sectional area to provide for a compensation of any crests and troughs in the frequency response curve of the microphone due to a formation of standing waves in said tubes.

The means defining said cavity may comprise a peripheral wall formed with one or more openings, consisting, e. g., of substantially round holes or substantially elongated slots. The said openings may be distributed over the area of said wall and damping means may be provided in said opening or in one or more of said openings.

To avoid disturbing standing waves in the high frequency region the means defining said cavity may comprise a peripherally unapertured front portion next to said diaphragm and a rear portion disposed opposite to said diaphragm and formed with at least one peripheral aperture, the length of said front portion being not greater than one quarter of the shortest wavelength of said frequency range.

A similar effect will be achieved if the shortest of several tubes provided is open-ended opposite to said diaphragm and has a length not greater than one quarter of the shortest wavelength of said range.

Figs. 4 and 6 of the accompanying drawings show microphones in which the shortest sound path from the front face to the rear face of the diaphragm leads around the outside of the microphone to that point of said peripheral aperture which is next to said diaphragm or to the open end of said shortest tube opposite to said diaphragm and thence to the rear face of said diaphragm.

Tests have shown that a further improvement of the frequency response curve and of the unidirectional effect will be achieved if that shortest sound path is reduced in length and that optimum conditions will be obtained if the said sound path is substantially half the shortest wavelength of said frequency range.

When both requirements are fulfilled a considerable unidirectional effect will be ensured by the superposition of the pressure and pressure gradient components even in the high frequency region. An improvement in the frequency response curve and the directional characteristics can also be achieved if only the length of the peripherally unapertured front portion of the means defining said cavity or the length of the shortest of a plurality of tubes of stepped length is dimensioned as stated above, even if the sound path is long (e. g. due to a large baffle or diaphragm); in this case the directional effect in the high frequency region will be determined by the size of the diaphragm or baffle.

According to another feature of the invention it is desirable if the cavity or any of the tubes communicating with the low air chamber behind the diaphragm are of winding configuration, e. g. of spiral form, in order to save space.

Illustrative embodiments of the invention are shown in the accompanying drawings, in which Fig. 1 is a diagrammatic view of a moving-coil microphone according to the invention.

Figs. 2 and 3 respectively show the standing wave of the fundamental frequency as formed when the tube is closed and open.

Figs. 12a and 12b, 13a and 13b, 14a and 14b, 15a and 15b, and 16 show different forms of tubes in transverse section and in side elevation, respectively.

Figs. 17 and 18 respectively are simplified diagrammatic showings of a microphone and an equivalent electrical circuit diagram.

Fig. 19 shows another modification, in which a hollow body is provided instead of a tube, and Fig. 20 is the appertaining equivalent electrical circuit diagram.

Figure 1:
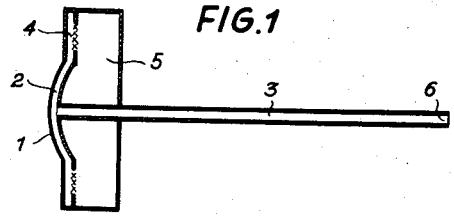

Fig. 1 is a diagrammatic view of a moving coil microphone whose diaphragm 1 is directly exposed to the sound field on one side. The rear face of the diaphragm forms a termination of a low air chamber, in which a tube 3 is inserted. An acoustical frictional resistance 4 is disposed between the air chambers 2 and 5. The tube forms a pipe for the sound entering into the opening 6 of the tube. That pipe resonates in the known manner at certain frequencies.

Figure 2:
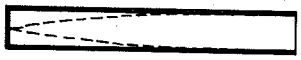
Figure 3:
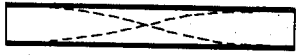

When the tube is closed, as is shown in Fig. 2, the fundamental wave produced, shown with a dash line, will have a wavelength which is four times the tube length. When the tube is open, as shown in Fig. 3, a standing wave will be formed which has an antinode at the tube end; this means that its wavelength is twice the tube length. All possible termination arrangements lie between the closed tube having a hard termination and the open tube.

If the tube is terminated by an impedance which corresponds to the characteristic impedance of an infinitely long tube, no reflected wave will occur. The magnitude of this terminating impedance is $z = \rho c f = 42 f$, wherein $f$ = effective cross-sectional area of the tube in square centimetres
$\rho$ = specific gravity of air = $1.2 \times 10^{-3}$ grams/cu. cm.
$c$ = velocity of sound in air = $3.3 \times 10^4$ cm./sec.

If standing waves in the tube 3 are to be suppressed in an arrangement according to Fig. 1, the impedance $\rho c f$ should be balanced if possible at the tube end which faces the low air chamber. Standing waves in the tube can be suppressed to a considerable extent if the diameter of the tube 3 has the proper relation to the diaphragm area.

When F and Z, respectively, designate the area and the impedance of the diaphragm, then $$\rho c f = Z \frac{f^2}{F^2}$$

must be fulfilled for optimum matching.

The magnitude of Z depends substantially on the magnitude of the frictional resistance 4 and on the natural vibration of the diaphragm 1 as determined by its rim gripping means and the returning force of the cavity 5.

Figure 4:
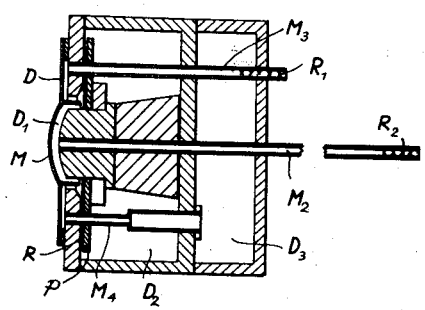
Fig. 4 is a diagrammatic sketch of a microphone having a cardioid directional characteristic and comprising two connected tubes.
Figure 5:
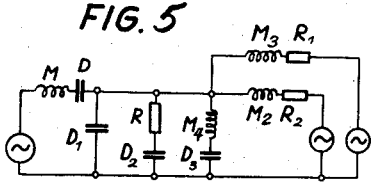
Fig. 5 is the appertaining equivalent electric circuit diagram.

According to the invention several tubes may be used to provide a microphone having an even flatter frequency response curve. Fig. 4 is a diagrammatic sectional view showing such a microphone having a cardioid directional characteristic and comprising a shorter tube $R_1$ having a relatively large cross-section and a longer tube $R_2$ having a relatively small cross-section, whereas Fig. 5 shows the appertaining equivalent electrical circuit diagram. The diaphragm M is gripped by means of a resilient rim D. The low air chamber $D_1$ has connected thereto two tubes having the acoustic masses $M_2$ and $M_3$, respectively, and leading into the open. Sound-damping materials, such as cotton wool and the like may be introduced in the tubes at the points where the antinodes of the standing waves are disposed. Any of the tubes may be formed with lateral openings leading to the air chamber $D_3$ to provide for a filter effect in a manner known per se. For a unidirectional effect a number of acoustic impedances are provided which are responsive to the sound pressure. They comprise the frictional resistance R in the narrow slot between the pole plate and the disc-shaped damping plate P, the air chamber $D_2$, the mass plug $M_4$ and the air chamber $D_3$, which provide in a manner known per se for a constant velocity of the moving coil under a constant sound pressure acting on the diaphragm. It is noted that the air chamber $D_2$ communicates with the diaphragm through the frictional resistance R formed by the gap between the front end of the microphone casing and the plate P whereas the mass plug $M_4$ and the air chamber $D_3$ connected thereto communicate with the diaphragm along a path which extends around the moving coil.

Figure 6:
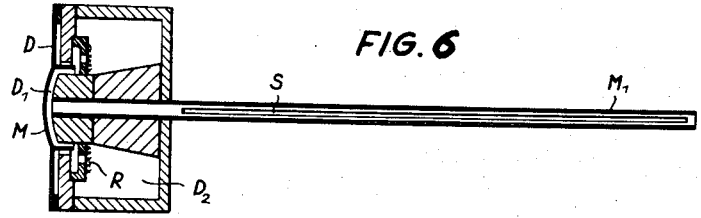
Fig. 6 is a microphone having a unidirectional effect and formed with a longitudinal slot.

Fig. 6 shows a unidirectional microphone which contains a tube whose periphery is formed with a longitudinal slot S. The resulting effect is similar to that of a plurality of parallel tubes of different length. The diaphragm M and parts of the magnetic system form a low air chamber $D_1$, from which the air can pass through the frictional resistance R into the chamber $D_2$. The air chamber $D_1$ has connected thereto the tube $M_1$, which is formed with a longitudinal slot S. A very uniform effect is provided by a suitable dimensioning of the slot and insertion of damping material.

Figure 7:
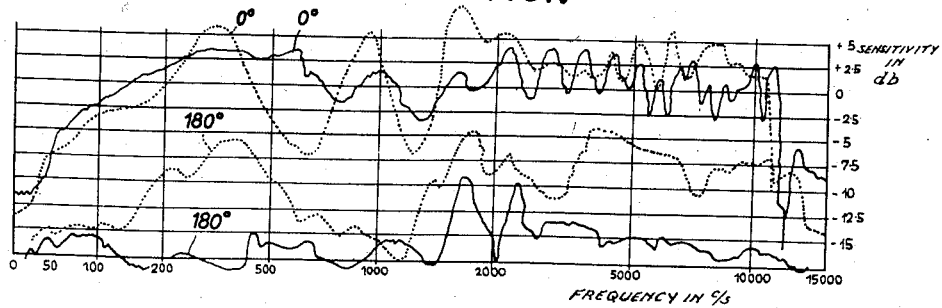
Fig. 7 shows frequency response curves which can be practically achieved with the constructions according to the invention.

In Fig. 7 the frequency response curves of a microphone having a tube 20 cm. long are shown with dash lines for a sound incidence at 0 deg. and 180 deg. The solid curve shows the frequency response curve achievable with two tubes of 20 cm. and 10 cm. length, respectively, also for a sound incidence at 0 deg. and 180 deg. The graph shows how the frequency response curves are flattened by the combination of several tubes. Instead of two tubes, any desired number of them may be provided, with any desired stepping in length and with the same or different cross-sectional area.

Figure 8:
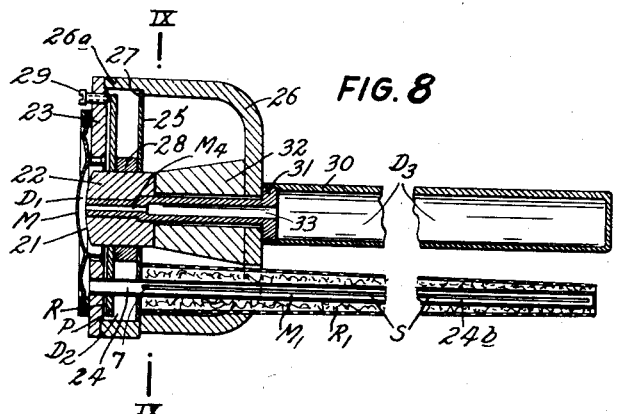
Fig. 8 shows an additional embodiment of a microphone according to the invention, which comprises a slotted tube.
Figure 9:
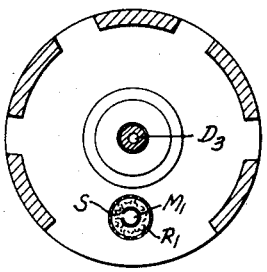
Fig. 9 is a sectional view taken on line IX—IX of Fig. 8.

Fig. 8 shows a microphone in which the shortest sound path from the front face to the rear face of the diaphragm is reduced in length. The slot in the tube begins at 7. The tube is surrounded by a cylinder of felt or the like, which covers the slot and which may be tapered towards the free end of the tube. Fig. 9 shows the construction according to Fig. 8 in a cross-sectional view. According to Figs. 8 and 9 an air chamber $D_3$ is provided which is connected by the plug $M_4$ to the low air chamber $D_1$. This arrangement provides for an accentuation of the lower frequencies in the pressure component. The tube forming the cavity $M_1$ is formed with the slot S and communicates with the low air chamber $D_1$ behind the diaphragm M. The second air chamber $D_2$ communicates with the low air chamber $D_1$ through the resistance R consisting of the gap formed between the plate P and the front end of the microphone casing.

Figures 10, 11:
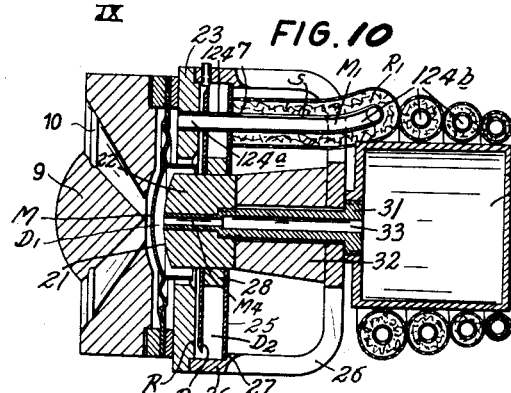
Fig. 10 shows a modification comprising a tube wound in spiral form.
Fig. 11 shows another form of the spiral sound duct.

In Fig. 10 functionally equivalent parts are designated with like reference as in Figs. 8 and 9.

It is further apparent from Figs. 8 and 9 that the pole 22 carries an annular disc 25, the rear face of which engages near its outside periphery a step 27 formed in the inside periphery of the casing 26. Thus, the second air chamber $D_2$ is completely closed toward the rear. The second air chamber $D_2$ is confined at its outside periphery by the front peripheral portion 26a of the casing 26 and forwardly by the pole plate 23. The second air chamber $D_2$ contains the movable annular disc P. A rubber ring 28 or another resilient element is inserted between the movable annular disc P and the rear annular disc 25 and tends to urge the disc P forwardly. At the same time, the rubber ring 28 confines the second air chamber $D_2$ at its inside periphery.

The frictional resistance R defined by the disc P and the pole plate 23 can be adjusted in width by the screw 29, which extends through the pole plate 23 in threaded engagement therewith and engages the front face of the disc P. The screw 29 has a slotted head which is accessible on the front side of the pole plate 23.

The third air chamber $D_3$ is confined by the tube 30, which is closed at its rear end and which is continued at its front end by the hollow screw 31, which extends through the magnet 32 and is in threaded engagement with the pole 22. The hollow screw 31 has a stepped bore, the wider rear portion 33 of which forms a part of the third air chamber $D_3$ whereas the front portion of the bore of the screw 31 forms the air plug $M_4$.

Fig. 10 illustrates a modification of the invention, comprising a tube 124 which is coiled to form a spiral and which has an acoustic effect similar to that of the straight tube. In this case the slot begins also at 7. The tube 124 consists of an unslotted front portion 124a and a slotted rear portion 124b. In the embodiment of Fig. 10 the third air chamber $D_3$ is defined by a hollow cylindrical member 130, around which the tube 124 is coiled. In other respects, similar parts are designated with similar reference characters in Figs. 8 and 10. Instead of the slot the tube may be formed with juxtaposed holes; in this case the hole next to the diaphragm is spaced from the latter by a distance which corresponds to a quarter wavelength of the highest sound. In front of the diaphragm a solid of revolution 8 may be arranged, which forms a flat air chamber between its curved bottom surface and the diaphragm. The conical body 9, which is held by arms 10, is concentrically disposed with respect to said solid of revolution. Thus the solid of revolution 8 and the conical body 9 form a speech input device having an annular funnel, known per se, which may increase in cross-sectional area as desired. This construction provides for a flattening of the frequency response curve and an improvement of the directional characteristic in the high frequency region.

Fig. 11 shows another embodiment of the sound duct or cavity of spiral configuration. The bass resonance chamber or inner core member 11 has on its cylindrical outside periphery a winding or spiral groove or recess 12, and is fitted in an outer tubular member 13, which is formed with holes or slots 14. A cylinder 15 of damping material, e. g. felt, is pushed over the tube 13.

Figures 12A, 12B:
Figures 13A, 13B:
Figures 14A, 14B:
Figures 15A, 15B:
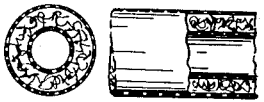

Figs. 12a and 12b, 13a and 13b, 14a and 14b, and 15a and 15b show different embodiments of tubes. Figs. 12a and 12b show a tube formed with an elongated slot, Figs. 13a and 13b, a tube formed with substantially round holes. Figs. 14a and 14b show the tube consisting of wire mesh with a felt sleeve passed thereover, and Figs. 15a and 15b represent a hollow cylinder of felt.

Figure 16:
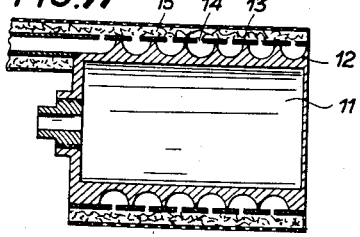

Fig. 16 shows another embodiment of the tube, containing in its interior a cylinder which consists of damping material. Openings are formed at 16, 17 and 18 and may be covered by damping material.

The mode of operation of the microphones according to the invention shown in Figs. 8 and 10 may be explained with reference to the simplified diagrammatic showing of Fig. 17 and the equivalent electrical circuit diagram of Fig. 18.

The diaphragm having the mechanical impedance $Z_M$ is coupled at the rear to the impedance $Z_D$. The latter is formed in a manner known per se by acoustical frictional resistances, acoustic masses and air cushions, which are shut off from the outside air. The rear face of the diaphragm has also coupled thereto an acoustical transmission line, which is represented in the equivalent circuit diagram by the impedances $Z_1$, $Z_2$ and $Z_3$, which are parallel to $Z_D$. The rear side of the diaphragm is exposed to the sound vibrations through openings in the acoustical transmission line comprising the impedances $Z_1$, $Z_2$, $Z_3$; the resulting driving force occurring at the diaphragm corresponds to the difference between the sound pressure at the front face of the diaphragm and the sound inlet openings of the acoustical transmission line. The parallel connection of $Z_D$ with respect to the impedances $Z_1$, $Z_2$, $Z_3$ enables independent adjustments with respect to the sound pressure and the pressure gradient component. Thus a sound receiver can be provided which distinguishes by a fairly horizontal frequency response curve in the transmitted frequency range, frequency-independent unidirectional effect and high efficiency.

The acoustical transmission line may be designed in various ways.

Fig. 19 is a diagrammatic sectional view showing by way of example a microphone which comprises instead of a tube a hollow body formed with openings, of which those next to the diaphragm provide for the short sound path required. The corresponding equivalent electrical circuit diagram is shown in Fig. 20.

The diaphragm is directly exposed to the sound field on one side, on the other side it is adjoined by a low air chamber $D_1$ to which are connected the frictional resistance R with chamber $D_2$, and the chamber $D_3$ with the openings $M_2R_2(E_1)$, $M_3R_3(E_2)$, $M_4R_4(E_3)$. After the sound waves have passed through these openings and have been changed in phase and magnitude they can reach the rear face of the diaphragm through the openings $M_1R_1$. The advantage of the parallel arrangement of R—$D_2$ with respect to $D_3$ results from the fact that R—$D_2$ can be varied independently of the other acoustic impedances. A calculation of the impedance R shows that it must be about ten times as great as the impedances lying in the path of the sound waves passing to the rear face of the diaphragm. In a microphone which comprises this parallel arrangement of the acoustic impedances for the sound pressure and the pressure gradient an optimum cancellation in the case of sound incidence from the rear is possible. The arrangement of impedances is apparent from the equivalent circuit diagram. The tube $M_5$, $R_5$ which opens into the chamber $D_2$, serves in a manner known per se for boosting the lower frequencies which respond to the sound pressure.

Another special advantage of the arrangements according to the invention resides in that the fundamental resonance of the diaphragm, determined by the mass of the diaphragm with moving coil and the returning force of the resilient rim D, can be chosen high enough to insure a sufficient reliability in operation and low shock and wind sensitivity of the microphone.

This fundamental resonance lies between 300 and 600 c/s. The pressure gradient at lower frequencies is increased with the aid of the acoustical transmission line according to Figs. 1, 2, 3, 4, 5, 10 and 11 and the hollow body of Fig. 19 so that a horizontal frequency curve down to the low frequency region is achieved in spite of a relatively high fundamental resonance of the diaphragm.

The length of the cavity formed by the tube 3 in Fig. 1, the tube $M_3$ in Fig. 4, the tube $M_1$ in Fig. 6, the slotted tube in Fig. 8, the spiral tube in Fig. 10, the spiral groove 12 in Fig. 11, and acoustical transmission line in Fig. 17 and the hollow body in Fig. 19 is substantially less than ten feet and substantially more than 1 inch, to be substantially smaller than the length of the longest wavelength of the frequency range in which the microphone is responsive and to be substantially greater than the length of the shortest wavelength of said frequency range.

I claim:

1. A unidirectional dynamic microphone responsive in a certain frequency range and comprising a single diaphragm, means defining a first air chamber with the rear face of said diaphragm, means defining at least one cavity whose length is substantially larger than the shortest wavelength of said frequency range, said cavity being arranged to connect said first air chamber to the sound field surrounding the microphone and having such an effective cross-sectional area that said diaphragm forms with respect to said one cavity a terminating impedance which corresponds substantially to the characteristic impedance of a cavity of said effective cross-sectional area and of infinite length, means defining a second air chamber, and frictional resistance means connecting said second air chamber to said first air chamber, said one cavity bypassing said second air chamber and said frictional resistance means.

2. A unidirectional dynamic microphone responsive in a certain frequency range and comprising a single diaphragm, means defining a first air chamber with the rear face of said diaphragm, means defining a cavity whose length is substantially larger than the shortest wavelength of said frequency range, said cavity being arranged to connect said first air chamber to the sound field surrounding the microphone and having such an effective cross-sectional area that said diaphragm forms with respect to said cavity a terminating impedance which corresponds substantially to the characteristic impedance of a cavity of said effective cross-sectional area and of infinite length, means defining a second air chamber, and frictional resistance means connecting said second air chamber to said first air chamber, said cavity bypassing said second air chamber and said frictional resistance means, said means defining said cavity comprising a peripheral wall formed with at least one opening.

3. A microphone as set forth in claim 2, in which said peripheral wall is formed with at least one substantially round hole.

4. A microphone as set forth in claim 2, in which said peripheral wall is formed with at least one substantially elongated slot.

5. A microphone as set forth in claim 2, in which said peripheral wall is formed with a plurality of openings distributed over the area of said wall.

6. A microphone as set forth in claim 2, which comprises sound damping material covering said openings.

7. A unidirectional dynamic microphone responsive in a certain frequency range and comprising a single diaphragm, means defining a first air chamber with the rear face of said diaphragm, a tube forming a cavity whose length is substantially larger than the shortest wavelength of said frequency range and which is arranged to connect said first air chamber to the sound field surrounding the microphone, said cavity having such an effective cross-sectional area that said diaphragm forms with respect to said cavity a terminating impedance which corresponds substantially to the characteristic impedance of a cavity of said effective cross-sectional area and of infinite length, said tube being closed at the end opposite to said diaphragm and formed with a longitudinal slot, means defining a second air chamber, and frictional resistance means connecting said second air chamber to said first air chamber, said cavity bypassing said second air chamber and said frictional resistance means.

8. A microphone as set forth in claim 7, which comprises sound damping material covering said slot.

9. A unidirectional dynamic microphone responsive in a certain frequency range and comprising a single diaphragm, means defining a first air chamber with the rear face of said diaphragm, means defining a cavity whose length is substantially larger than the shortest wavelength of said frequency range, said cavity being arranged to connect said first air chamber to the sound field surrounding the microphone and having such an effective cross-sectional area that said diaphragm forms with respect to said cavity a terminating impedance which corresponds substantially to the characteristic impedance of a cavity of said effective cross-sectional area and of infinite length, said means defining said cavity comprising a peripherally unapertured front portion next to said diaphragm and a rear portion disposed opposite to said diaphragm and formed with at least one peripheral aperture, the length of said front portion being not greater than one quarter of the shortest wavelength of said frequency range, means defining a second air chamber, and frictional resistance means connecting said second air chamber to said first air chamber, said cavity bypassing said second air chamber and said frictional resistance means.

10. A microphone as set forth in claim 9, in which the shortest sound path from the front face of said diaphragm around the outside of the microphone to the point of said peripheral aperture which is nearest to said diaphragm and thence to the rear face of said diaphragm is substantially half the shortest wavelength of said frequency range.

11. A unidirectional dynamic microphone responsive in a certain frequency range and comprising a single diaphragm, means defining a first air chamber with the rear face of said diaphragm, means defining a cavity whose length is substantially larger than the shortest wavelength of said frequency range, said cavity being arranged to connect said first air chamber to the sound field surrounding the microphone and having such an effective cross-sectional area that said diaphragm forms with respect to said cavity a terminating impedance which corresponds substantially to the characteristic impedance of a cavity of said effective cross-sectional area and of infinite length, means defining a second air chamber, frictional resistance means connecting said second air chamber to said first air chamber, means defining a third air chamber, and means defining an air plug connecting said third air chamber to said first air chamber, said cavity bypassing said second and third air chambers, frictional resistance means, and air plug.

12. A microphone as in claim 1; wherein said means defining at least one cavity consists of a tube the interior of which defines said one cavity.

13. A microphone as in claim 1; wherein said means defining at least one cavity includes a first tube defining said one cavity and at least one additional tube connected to said first air chamber and having a length shorter than the length of said first tube, and wherein all said first and additional tubes are stepped in length to provide for a compensation of any crests and troughs in the frequency response curve of the microphone due to a formation of standing waves in said tubes.

14. A microphone as in claim 13; wherein said tubes have different cross-sectional areas.

15. A microphone as in claim 1; wherein said one cavity is defined by a tube which is open at the end thereof opposite to said diaphragm, and further comprising means defining at least one further chamber, said tube having at least one peripheral opening leading to said one further chamber.

16. A microphone as in claim 1; wherein said means defining at least one cavity includes a first tube forming said one cavity and at least one additional tube connected to said first chamber and having a length shorter than said first tube, all said first and additional tubes being stepped in length to provide for a compensation of any crests and troughs in the frequency response curve of the microphone due to standing waves in said tubes, and further comprising means defining at least one further chamber, at least one of said tubes being open at the end thereof opposite to said diaphragm and having at least one peripheral opening leading to said one further chamber.

17. A microphone as in claim 1; wherein said means defining at least one cavity includes a first tube forming said one cavity and at least one additional tube connected to said first air chamber and having a length shorter than said first tube, all said first and additional tubes being stepped in length to provide for a compensation of any crests and troughs in the frequency response curve of the microphone due to a formation of standing waves in said tubes, the shortest of said tubes being open at the end thereof opposite to said diaphragm and having a length not greater than one quarter of the shortest wave length of said range.

18. A microphone as in claim 17; wherein the shortest sound path from the front face of said diaphragm around the outside of the microphone to said open end of said shortest tube opposite to said diaphragm and thence to the rear face of said diaphragm is substantially half the shortest wavelength of said frequency range.

19. A microphone as in claim 1; wherein said one cavity has a winding configuration.

20. A microphone as in claim 19; wherein said means defining said one cavity includes a winding tube.

21. A microphone as in claim 19; wherein said means defining said one cavity includes a spiral tube.

References Cited in the file of this patent

UNITED STATES PATENTS

| | | |
|---|---|---|
| 2,401,328 | Black | June 4, 1946 |
| 2,515,031 | Black | July 11, 1950 |